United States Patent [19]

Kobayashi

[11] Patent Number: 4,723,778

[45] Date of Patent: Feb. 9, 1988

[54] AUTOMATIC LUBRICATING SYSTEM OF POWER CHUCK

[75] Inventor: Takeo Kobayashi, Nagoya, Japan

[73] Assignee: Howa Machinery, Ltd., Aichi, Japan

[21] Appl. No.: 926,624

[22] Filed: Nov. 4, 1986

[30] Foreign Application Priority Data

Nov. 6, 1985 [JP] Japan .............................. 60-171527[U]

[51] Int. Cl.⁴ ........................ B23B 31/16; B23B 31/30
[52] U.S. Cl. ............................................. 279/4; 279/121
[58] Field of Search .................. 279/1 R, 4, 20, 110, 279/121, 122, 123

[56] References Cited

U.S. PATENT DOCUMENTS

| | | | |
|---|---|---|---|
| 3,468,551 | 9/1969 | Sampson | 279/4 |
| 4,033,207 | 7/1977 | Peuterbaugh | 279/121 |
| 4,493,041 | 1/1985 | Antoni | 279/4 |
| 4,591,171 | 5/1986 | Stone | 279/4 |

FOREIGN PATENT DOCUMENTS

| | | | |
|---|---|---|---|
| 3220585 | 12/1983 | Fed. Rep. of Germany | 279/121 |
| 179710 | 12/1980 | Japan . | |
| 2306 | 1/1981 | Japan . | |
| 31602 | 7/1985 | Japan . | |
| 1074662 | 2/1984 | U.S.S.R. | 279/4 |

*Primary Examiner*—Z. R. Bilinsky
*Attorney, Agent, or Firm*—Wenderoth, Lind & Ponack

[57] ABSTRACT

A machine-tool power chuck operated by pressurized gas supplied from an gas pressurizing source has a piston-cylinder actuator having a piston dividing the piston chamber into a rear pushing side and a front pulling side. When the pressurized gas is supplied into the pushing side, a wedge plunger in a sliding chamber is caused to shift whereby workpiece chucking jaws are opened, and, when the pressurized gas is supplied into the pulling side, the jaws are moved inward for chucking the workpiece. Oil mist supply passages communicate at the opposite ends thereof respectively to the pushing and pulling sides of the actuator and have, at a branching junction thereof from which a gas injection passage branches off, a control valve in the form of a shuttle valve having a shiftable ball. The control valve operates to cut off communication of the gas injection passage with one of the pushing and pulling sides, to which the pressurized gas is not supplied. The pressurized gas is provided with an oil mist for lubrication. When the piston is operated, the pressurized gas acting on the piston and containing the oil mist is allowed to flow via the control valve into the gas injection passage and then into the sliding chamber for the wedge plunger, thereby lubricating the rubbing surfaces of the sliding chamber and the wedge plunger as well as other adjoining members.

10 Claims, 6 Drawing Figures

AUTOMATIC LUBRICATING SYSTEM OF POWER CHUCK

BACKGROUND OF THE INVENTION

This invention relates generally to chucks mounted on spindles of machine tools for holding workpieces. More particularly the invention relates to an automatic oil-supplying or lubricating system of a power chuck for holding and rotating a workpiece, the lubricating system operating to supply positively lubricating oil to the sliding or rubbing surfaces of the chuck requiring lubrication.

A large number of lubricating systems or devices of machine-tool chucks have been proposed heretofore as, for example, in Japanese Utility Model Application Laid-Open (Kokai) No. 179710/1980 and Utility Model Application Laid-Open (Kokai) No. 2306/1981. While the structural organizations of these proposed lubricating systems are respectively different, each system comprises an independent system for carrying out lubrication and requires an oil supply piping path exclusively for lubrication.

An independent lubrication system with an exclusive supply piping is not fully satisfactory since its organization is complicated, and its maintenance is troublesome.

SUMMARY OF THE INVENTION

This invention seeks to overcome the above described problem by providing an automatic lubricating system of a power chuck in which system an independent oil supplying device is not used, but a portion of the pressurized air used to pneumatically actuate the piston of a wedge plunger in the chuck is utilized by injecting it into the sliding chamber of the wedge plunger, thereby causing the oil mist contained in the pressurized air to lubricate the various sliding or rubbing surfaces of the chuck. Because of the injection of the pressurized air into the sliding chamber, the interior of the chuck body is at a pressure higher than the outside, which is advantageous in preventing chips and cutting liquid from intruding into the chuck body.

According to this invention, briefly summarized, there is provided an automatic lubricating system of a machine-tool power chuck operated by pressurized gas or air supplied from a pressurizing source, caused to contain an oil mist for lubrication, and conducted via two passages respectively to the pushing and pulling sides of a piston-cylinder actuator for actuating plunger means slidably disposed within a sliding chamber in said chuck for moving workpiece clamping jaws, the automatic lubricating system comprising a pair of oil supply passages communicating at one ends thereof respectively to the pushing and pulling sides of the actuator, an air injection passage connected at one end thereof to the other end of said oil supply passages and at the other end thereof to said sliding chamber, and control valve means installed in said oil supply passages to shut off communication of the air injection passage with one of the pushing and pulling sides of the actuator, to which the pressurized air is not supplied and to allow communication of the air injection passage with the other of said pushing and pulling sides, to which the pressurized air is supplied.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

Figure 1:
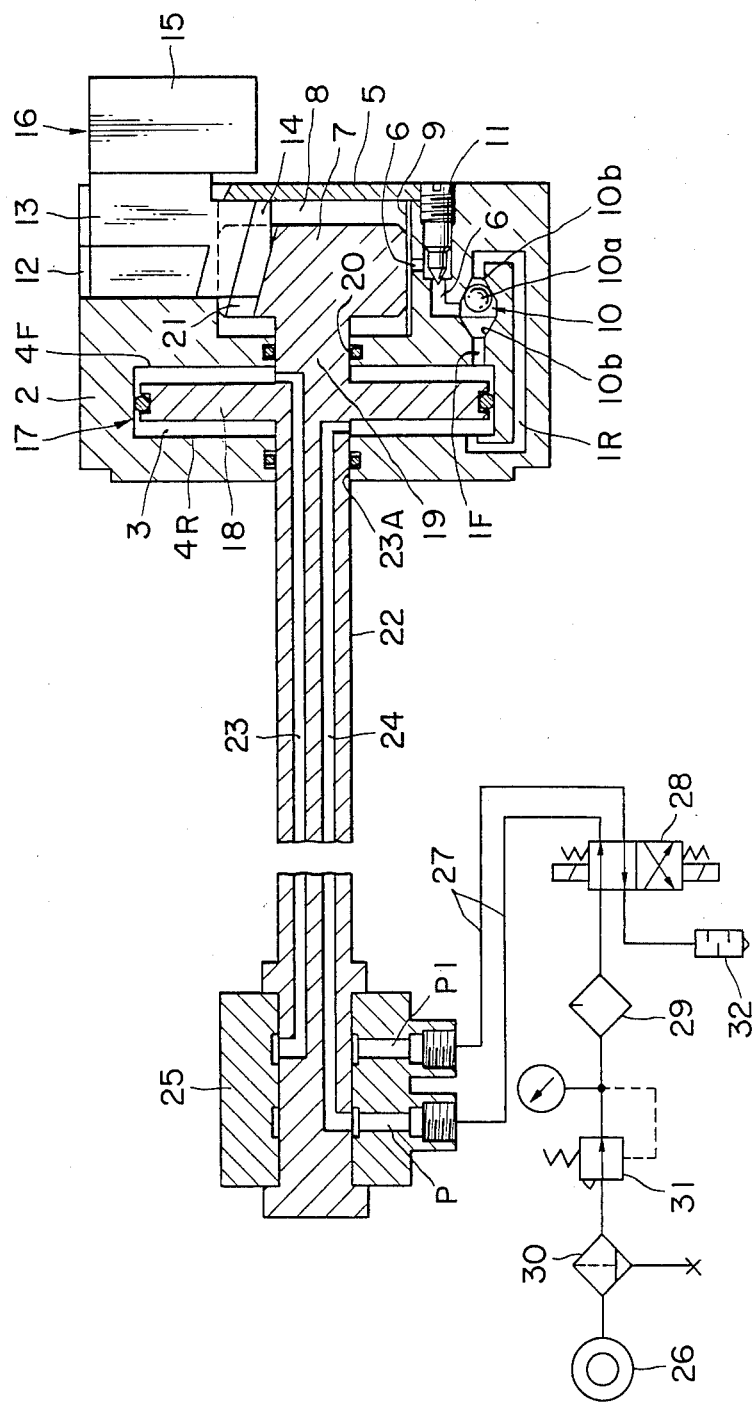
FIG. 1 is a simplified side view, in longitudinal section, of a power chuck provided with one example of the automatic lubricating system according to this invention, an example of means for supplying pressurized air containing oil mist to the chuck being shown by a schematic diagram.
Figure 2:
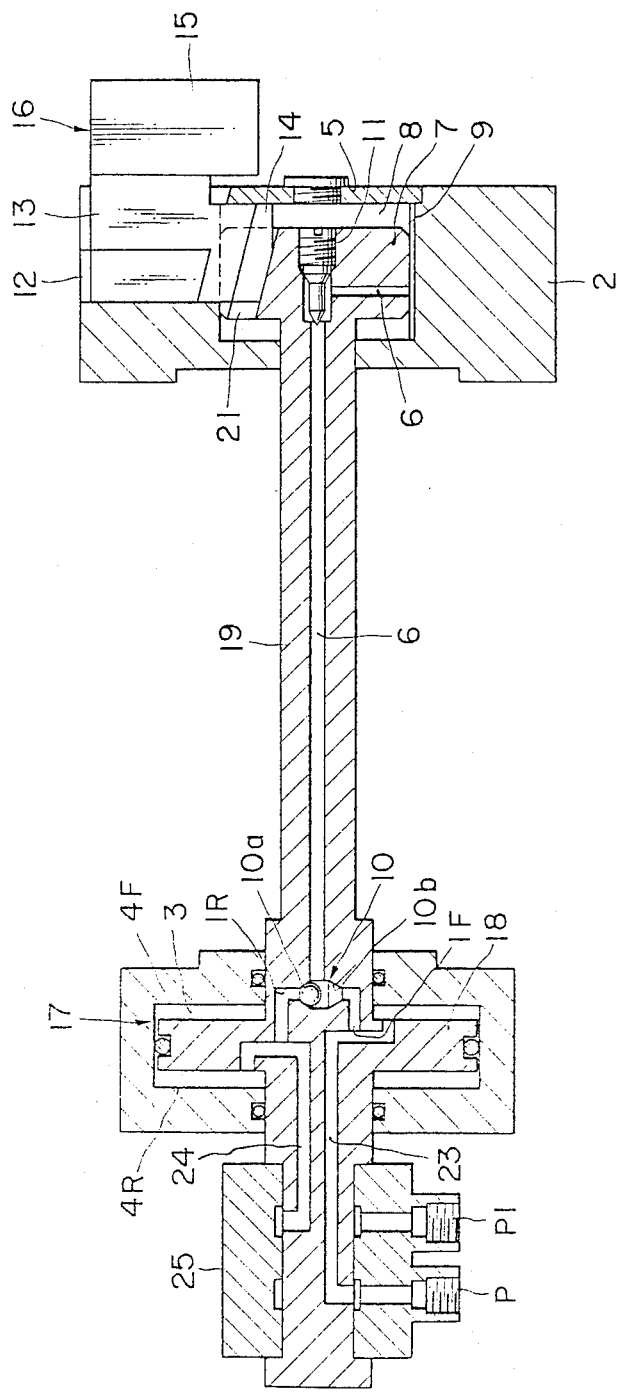
FIG. 2 is a simplified side view, in longitudinal section, of another example of the lubricating system of the invention.

FIGS. 1 and 2 illustrating embodiments of this invention are for the purpose of explaining the principle of the invention and are in an extremely simplified and abbreviated form, in which aspects such as ease of fabrication and assembly have not been considered.

The principal structure of the chuck shown in FIG. 1 is a chuck body 2, which is provided at the center of its front part with a sliding chamber 8 for a wedge plunger 7 to be described hereinafter. The front face, including this sliding chamber 8, is fabricated to be open in the forward (right-hand) direction and is closed by a cover plate 5. The front part of the chuck body 2 is further provided with a plurality of known jaw slots 12 disposed radially about the chuck center at equally spaced angular intervals. These jaw slots 12 are open toward the front (right) and at their radially inner ends open into the sliding chamber 8. In each of these jaw slots 12 is slideably fitted a known master jaw 13 having a wedge part 14 which, as is well known in the art, has a Tee-shaped cross section at its radially inner end part and is so inclined as to approach the longitudinal center line axis toward the front. Each master jaw 13 and a top jaw 15 mounted on the front face thereof constitute a so-called chuck jaw 16.

The chuck body 2 is provided at its rear part with a built-in pneumatic or air cylinder 17 having a piston chamber 3, in which a piston 18 is slideably fitted and divides the piston chamber 3 into a rear pushing side 4R and a front pulling side 4F. A draw bar 19 extends forward and coaxially from the front side of the piston 18, being slideably but sealably fitted in a hole 20 formed centrally in the chuck body 2, and projects into the aforedescribed sliding chamber 8. The front end of this draw bar 19 is fixed to the aforementioned wedge plunger 7, which is slideably fitted in the sliding chamber 8.

Against the outer periphery of the wedge plunger 7 are fitted the Tee-shaped wedge parts 14 of the master jaws 13. The wedge parts 14 are slideably fitted in corresponding Tee-shaped wedge grooves 21 formed in the wedge plunger 7.

An air pipe 22 connected to the rear face of the piston 18 extends rearward through a hole 23A formed in the rear part of the chuck body 2. Two air passages 23 and 24 which are formed longitudinally through this air pipe 22 are communicatively connected at their rear ends to air ports P and P1, respectively, of a rotary valve 25 connected to the rear end of the air pipe 22. The front ends of the air passages 23 and 24 are communicatively connected to the pulling side 4F and the pushing side 4R, respectively, of the piston chamber 3. Thus a pneumatic type power chuck is constituted.

The power chuck of the above described construction is coaxially mounted on the front end of a work spindle of a machine tool (not shown) between the chuck body 2 and the rotary valve 25, and the entire assembly of the chuck and the spindle, except for the rotary valve 25, is adapted to rotate unitarily. The air ports P and P1 are connected to a pressurized air source such as a compressor 26 by way of air piping 27, in which a changeover valve 28 is installed for appropriate changing over of compressed air supplied to the air passages 23 and 24. The compressed air supply piping 27 is further provided with accessory devices such as an oil supplying device or tank 29 for dispersing an oil mist into the compressed air, an air filter 30 and a pressure regulator 31. Reference numeral 32 denotes a muffler. These features are known in the art.

According to this invention, there is provided, in a power chuck and accessory devices of the above described organization, an automatic oil supplying device of the following description. In the illustrated embodiment, the chuck body 2 is provided therein with a pair of oil supply passages 1F and 1R, which communicate at one ends thereof, respectively, with the pulling side 4F and the pushing side 4R of the piston chamber 3. An air injection passage 6 communicates at one end thereof with the other ends of the oil supply passages 1F and 1R and at the other end thereof with the aforementioned sliding chamber 8 for the wedge plunger 7. At the part of the chuck body 2 where the air passage 6 thus communicates with the sliding chamber 8, an air injection groove 9 is formed in the chuck body 2 in the direction of the chuck axis.

At the juncture point between the air injection passage 6 and the other ends of the oil supply passages 1F and 1R, a control valve 10 such as a shuttle valve comprising a ball 10a and two opposite ball seats 10b, for example, is provided and operates to open only the side in which pressurized air is acting and closes the other side, whereby at no time can the two passages 23 and 24 become mutually communicative. Furthermore, at an intermediate point in the air injection passage 6 between the control valve 10 and the air injection groove 9, a flow-rate regulating valve 11 such as a needle valve, which can be adjusted from the outside, is provided to regulate appropriately the flow rate of the air injected through the air passage 6.

The pressurized air supplied from the pressurized air source 26 is switched by the changeover valve 28 and is thus supplied alternately to the pulling side 4F and the pushing side 4R of the piston chamber 3 thereby to cause the chuck to grasp the workpiece and to release the same after machining. This operation is the same as that in a known chuck.

When the pressurized air is supplied through the air passages 23 to the pulling side 4F of the piston chamber 3, the wedge plunger 7 is pulled rearward (leftward as viewed in FIG. 1), and the chuck jaws 16 slide toward the centerline of the chuck body 2 to grasp the workpiece (not shown). At the same time, the pressurized air blows into the oil supply passage 1F. Consequently the ball 10a of the control valve 10 is urged against the right-hand ball seat 10b as shown and closes the pushing side 4R and the oil supply passage 1R, whereupon the pressurized air containing oil mist is injected through the air injection passage 6 into the sliding chamber 8 through the air injection groove 9, thereby instantaneously filling the interior of the chamber 8. As a consequence, the various sliding parts are lubricated by the oil mist contained in and borne by the pressurized air. Since the front face side of the sliding chamber 8 is closed by the cover plate 5 as described hereinbefore, the pressurized air and oil mist cannot scatter outside, and effective lubrication can be accomplished.

When pressurized air is supplied through the air passage 24 to the pushing side 4R of the piston chamber 3, the ball 10a of the control valve 10 is urged against the left-hand ball seat 10b and closes the pulling side 4F and at the same time directs the pressurized air into the interior of the sliding chamber 8 similarly as described above. At the same time, the flow rate regulating valve 11 appropriately regulates the flow rate of the pressurized air blown into the sliding chamber 8 so that a quantity of the pressurized air which will bring about ample lubrication is thus supplied without impairing the original function of the chuck.

In another embodiment of the invention as illustrated in FIG. 2, the cylinder 17 is not formed integrally with the chuck body 2 but is provided as a separate structure in the vicinity of the rotary valve 25, and the wedge plunger 7 is actuated by a relatively long draw bar 19. Furthermore, the air injection passage 6 connected to the oil supply passages 1F and 1R extends through the interior of this draw bar 19 and opens into the sliding chamber 8 in the chuck body 2. The positions of the opening ends of the pneumatic air passages 23 and 24 differ somewhat from those in the preceding embodiment, but the functions thereof are exactly alike.

Figure 3:
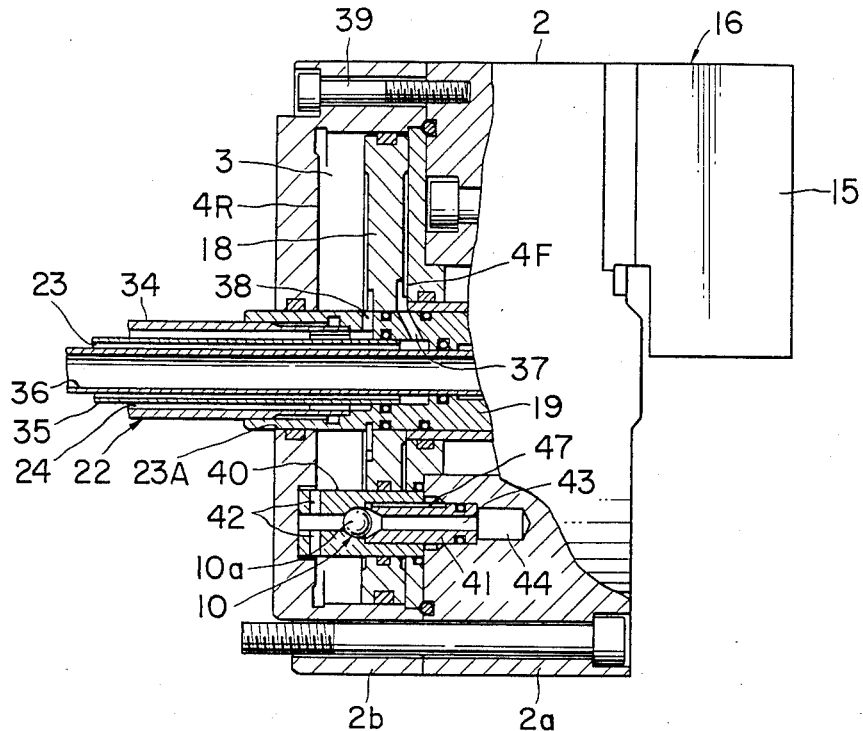
FIG. 3 is a side view, partly in longitudinal section, of a further example of the lubricating system of the invention.
Figure 4:
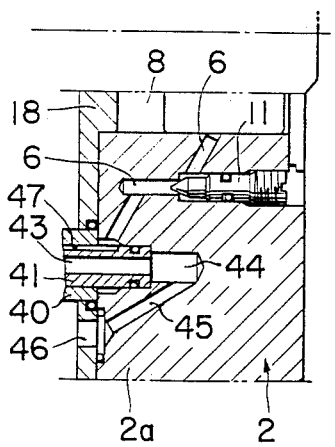
FIG. 4 is a fragmental side view of the lubricating system shown in FIG. 3, the view being in longitudinal section taken along a plane other than that in FIG. 3.

In a further embodiment of the invention as illustrated in FIGS. 3 and 4, the air pipe 22 is formed by three coaxial pipes 34, 35 and 36 fixedly secured to the draw bar 19 at their forward ends. The inner and intermediate pipes 36 and 35 define therebetween an air passage 23, and the intermediate and outer pipes 35 and 34 define therebetween an air passage 24. The air passage 23 is communicatively connected through a passage 37 to the pulling side 4F of the piston chamber 3, and the air passage 24 through a passage 38 to the pushing side 4R.

In this embodiment, an axially extending cylindrical member 40 passes through an axial hole formed in the piston 18. The cylindrical member 40 is securely fitted at the rear end thereof into a recess formed in a rear chuck body section 2b which is secured to a front chuck body section 2a by means of bolts 39 to form the chuck body 2 and to define the piston chamber 3 therebetween. Because of the provision of this cylindrical member 40, the piston 18 is prevented from making angular displacement around the centerline axis during its axial movements.

The cylindrical member 40 may be provided with a control valve 10 therein. To this end, the cylindrical member 40 has therein an inner pipe member 41 which is snugly inserted into an enlarged bore of the cylindrical member 40 to form at the inner end of the bore a space for the control valve 10. The inner end of the bore serves as one ball seat, and the inner end of the pipe member 41 serves as the other ball seat. A ball 10a is disposed between the two opposite ball seats in a manner reciprocable between the ball seats.

The cylindrical member 40 has therein oil supply passages 42 communicatively connecting the piston chamber 3 on the pushing side 4R with the rear side of the ball 10a. At the front side of the ball 10a, the pipe member 41 has an interior passage 43 which is communicatively connected to the pulling side 4F of the piston chamber 3 by way of oil supply passages 44, 45 and 46 as shown in FIG. 4.

Between the cylindrical member 40 and the pipe member 41 is formed an axial passage 47 which is communicatively connected at one end thereof to the control valve 10 and at the other end thereof to an air injection passage 6 leading to the sliding chamber 8 as illustrated in FIG. 4. As in the previous embodiments, a flow-rate regulating valve 11 is installed in the air injection passage 6.

When the pressurized air is supplied through the air passage 23 to the pulling side 4F of the piston chamber 3, the chuck claws slide radially inward to grasp the workpiece. At the same time, the pressurized air blows into the oil supply passages 46, 45, 44 and 43. As a result, the ball 10a of the control valve 10 is urged against the left-hand ball seat as indicated in FIG. 3 and closes the pushing side 4R, whereupon the air injection is carried out through the passages 47 and 6 into the sliding chamber 8.

When the pressurized air is supplied through the air passage 24 to the pushing side 4R of the piston chamber 3, the chuck claws slide radially outward to release the workpiece. At the same time, the pressurized air blows into the oil supply passages 42 to urge the ball 10a against the right-hand ball seat to close the pulling side 4F, whereupon the air injection is also carried out through the passages 47 and 6 into the sliding chamber 8.

Figure 5:
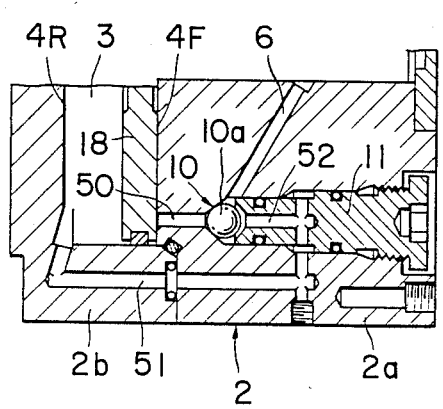
FIG. 5 is a fragmental side view, in longitudinal section, of a still further example of the lubricating system of the invention.

In a still further embodiment of the invention as illustrated in FIG. 5, the flow-rate regulating valve 11 serves to provide one of the ball seats for the ball 10a. The left-hand side of the control valve 10 is communicatively connected to the pulling side 4F of the piston chamber 3 by way of an oil supply passage 50, while the right-hand side of the valve 10 is communicatively connected to the pushing side 4R of the piston chamber 3 by way of an oil supply passage 51 formed in the chuck body 2 and of a passage 52 formed in the flow-rate regulating valve 11. It will be understood that this embodiment is advantageous in reducing the number of components used.

Figure 6:
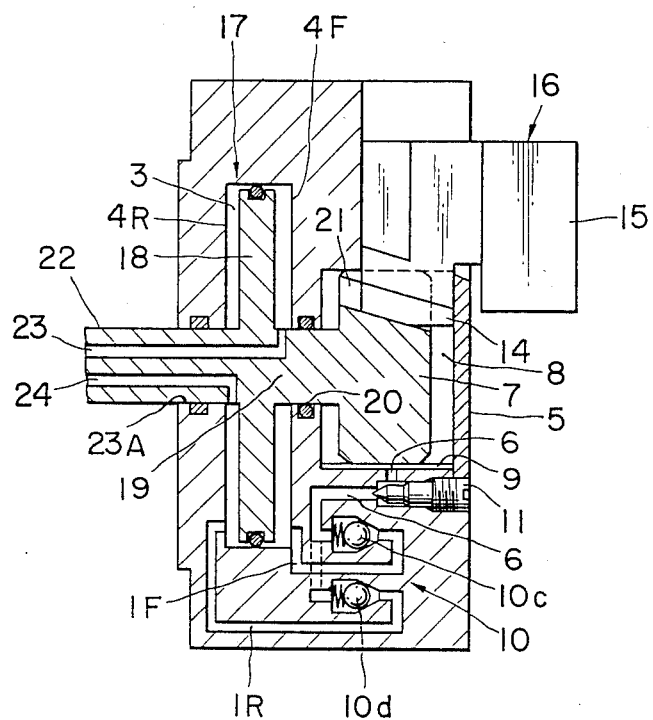
FIG. 6 is a fragmental side view, in longitudinal section, of a further example of the lubricating system of the invention.

FIG. 6 shows an embodiment of this invention in which the control valve 10 comprises a pair of check valves 10c and 10d which are disposed in the oil supply passages 1F and 1R, respectively. These check valves 10c and 10d open only in the direction toward the air injection passage 6. When pressurized air is introduced into the pulling side 4F, the valve 10c opens while the valve 10d closes, and when pressurized air is introduced into the pushing side 4R, the valve 10d opens and the valve 10c closes.

While this invention has been described above with respect to some embodiments thereof in which the chuck claws 16 are actuated by a wedge plunger 7, it should be understood that this invention is applicable with equal effectiveness to chucks employing other means for actuating the claws 16.

From the foregoing description, it will be apparent that this invention provides an automatic lubricating or oil-supplying system in a power chuck which can be installed in a simple manner by merely forming air passages, without providing a special oil-supplying device or system as in the prior art, and which utilizes oil mist contained in the pressurized air in the pneumatic operating system to carry out automatic lubrication of the rubbing parts of the chuck. Thus the invention provides an oil-supplying system of not only low fabrication cost but also of low maintenance cost.

What is claimed is:

1. A machine-tool power chuck, comprising a chuck body having an axial centerline, workpiece chucking jaws mounted on said chuck body for radial movement relative to the axial centerline of the chuck body;

plunger means slidably disposed within a sliding chamber in the chuck body and operatively associated with said chucking jaws to move the same radially inwardly and outwardly;

a piston-cylinder actuator for actuating said plunger means, said piston-cylinder actuator having a pulling side which, when supplied with pressurized gas, causes the plunger means to move the chucking jaws radially inwardly and a pushing side which, when supplied with pressurized gas, causes the plunger means to move the chucking jaws radially outwardly;

a pair of gas passage means connectable to a source of pressurized gas and connecting to said pulling and pushing sides of the actuator, respectively, to supply pressurized gas selectively to the pulling or pushing side;

an automatic lubricating system comprising means for supplying oil mist to the pressurized gas for lubrication;

a first oil mist supply passage means having one end connected to said pushing side of the actuator for receiving therein the pressurized gas containing the oil mist;

a second oil mist supply passage means having one end connected to said pulling side of the actuator for receiving therein the pressurized gas containing the oil mist;

gas injection passage means connected to the other ends of said first and second oil mist supply passage means and connecting to said sliding chamber for injecting pressurized gas containing the oil mist into the sliding chamber;

and control valve means installed in at least one of said oil mist supply passage means to allow communication of said gas injection passage means with the one of said pushing and pulling sides to which pressurized gas is supplied, and to prevent communication of said gas injection passage means with the other one of said pushing and pulling sides, whereby the pressurized gas containing the oil mist is injected into the sliding chamber for lubrication thereof both when the piston-cylinder actuator is operated for moving the chucking jaws radially inwardly and for when the piston-cylinder actuator is operated for moving the chucking jaws outwardly.

2. The combination according to claim 1, wherein said pair of oil mist supply passage means and gas injection passage means are provided in said chuck body.

3. The combination according to claim 11 wherein said gas injection passage means is connected to the sliding chamber by way of an injection groove formed in a wall of the sliding chamber in the direction of movement of said plunger means.

4. The combination according to claim 1 wherein said oil mist supply passage means extends outside the chuck body and the control valve means is disposed in said oil mist supply passage means outside the chuck body.

5. The combination according to claim 1 wherein said control valve means is a shuttle valve.

6. The combination according to claim 5 wherein the shuttle valve comprises a pair of spaced opposed ball seats, and a ball movable between the ball seats.

7. The combination according to claim 1 wherein a cylindrical member is secured to the chuck and extends axially and slidably through the piston of said piston-cylinder actuator to prevent angular movement of the piston, and said control valve means is disposed within the cylindrical member.

8. The combination according to claim 1, further comprising a flow-rate regulating valve installed in said gas injection passage means.

9. The combination according to claim 8 wherein a flow-rate regulating valve is provided in said chuck body to form therein an end part, adjoining the gas injection passage means, of one of said oil mist supply passage means, and said control valve means is disposed partly within said flow-rate regulating valve.

10. The combination according to claim 1, wherein said control valve means comprises a pair of check valves disposed in said pair of oil mist supply passage means, respectively, said pair of check valves allowing flow of the pressurized gas only in the direction toward the gas injection passage means.

* * * * *